United States Patent [19]

Koga

[11] Patent Number: 4,737,862

[45] Date of Patent: Apr. 12, 1988

[54] VIDEO SIGNAL RECORD/PLAYBACK DEVICE

[75] Inventor: Takashi Koga, Yokohama, Japan

[73] Assignee: Tokyo Shibaura Denki Kabushiki Kaisha, Kawasaki, Japan

[21] Appl. No.: 554,106

[22] Filed: Nov. 21, 1983

[30] Foreign Application Priority Data

Nov. 27, 1982 [JP] Japan .................. 57-206930

[51] Int. Cl.⁴ .............................. H04N 9/491
[52] U.S. Cl. ...................... 358/329; 358/314
[58] Field of Search .................. 358/314, 329, 31

[56] References Cited

U.S. PATENT DOCUMENTS

| | | |
|---|---|---|
| 2,996,576 | 8/1961 | Dolby . |
| 3,812,523 | 5/1974 | Nahaha .................. 358/4 |
| 4,122,489 | 10/1978 | Bolger et al. ............ 358/314 X |
| 4,218,696 | 8/1980 | Ushio et al. ............ 358/329 |
| 4,272,785 | 6/1981 | Fuhrer .................. 358/127 |
| 4,355,333 | 10/1982 | Sato .................... 358/31 X |
| 4,490,748 | 12/1984 | Kamath ................. 358/314 |
| 4,513,311 | 4/1985 | Hirai et al. ............ 358/329 X |
| 4,524,380 | 6/1985 | Shibata et al. .......... 358/329 X |
| 4,613,909 | 9/1986 | Tobe ................... 358/329 X |

FOREIGN PATENT DOCUMENTS

| | | |
|---|---|---|
| 2319768 | 10/1973 | Fed. Rep. of Germany . |
| 2408182 | 10/1974 | Fed. Rep. of Germany . |
| 2546378 | 4/1976 | Fed. Rep. of Germany . |
| 3116811 | 4/1982 | Fed. Rep. of Germany . |
| 53-132942 | 11/1978 | Japan . |
| 55-82583 | 6/1980 | Japan . |
| 57-140095 | 8/1982 | Japan .................. 358/329 |
| 58-117790 | 7/1983 | Japan .................. 358/329 |
| 2094092 | 9/1982 | United Kingdom . |

OTHER PUBLICATIONS

"A Base-Band Comb Filter for Consumer Television Receivers"; Lagoni et al, IEEE Transactions on Consumer Electronics, vol. CE-26, Feb. 1980, pp. 94-99.

Primary Examiner—Aristotelis M. Psitos
Attorney, Agent, or Firm—Cushman, Darby & Cushman

[57] ABSTRACT

In a record mode, a record video signal applied to an input terminal is separated into a luminance signal and a color signal by a comb filter made up of a 1H delay line, an adder circuit and a subtraction circuit. In a playback mode, the reproduced luminance signal and color signal are added together in an adder circuit, thereby to form a video signal. This video signal is applied to the comb filter through switches and then is separated into a luminance signal and a color signal.

4 Claims, 3 Drawing Sheets

FIG. 2A
FIG. 2B
FIG. 2C
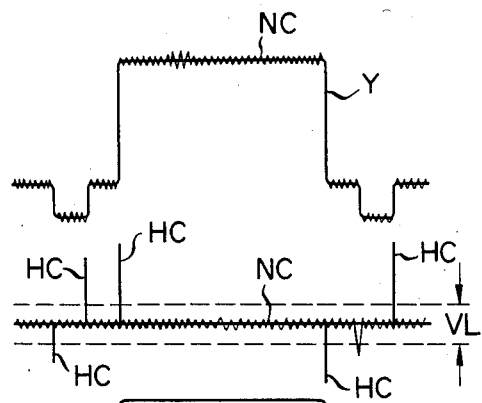
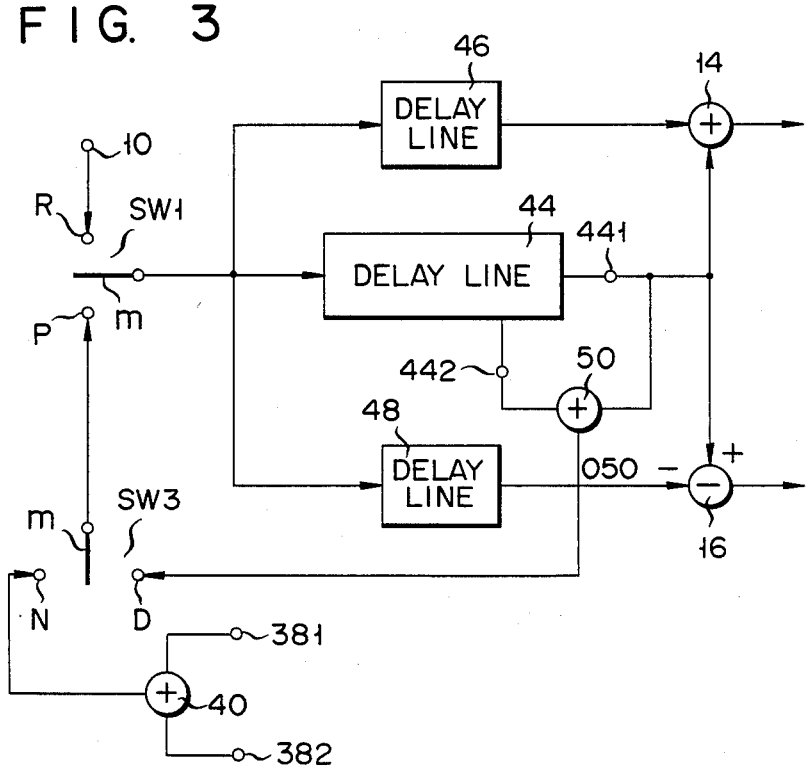
FIG. 3

F I G. 4
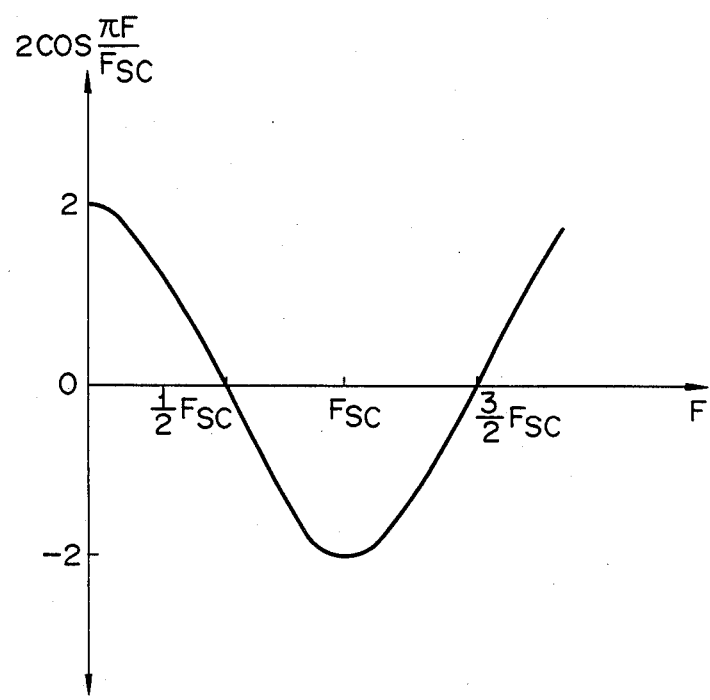

VIDEO SIGNAL RECORD/PLAYBACK DEVICE

BACKGROUND OF THE INVENTION

The present invention relates to a video signal record/playback device for use in a video tape-recorder, for example. More particularly, the invention relates to an improvement of a comb filter, which is used in the video tape-recorder.

For recording a video signal in the video tape-recorder, the video signal is generally separated into a luminance signal and a color signal. The luminance signal is frequency modulated, while the color signal is frequency-converted into a low frequency. Then, both signals are mixed and recorded into a magnetic tape.

For playing back the video signal, the crosstalk removal or the drop-out compensation are performed by using a 1H-corelation of the video signal (H is a horizontal scanning period).

A 1H delay line is used for each of video signal separation, crosstalk removal, and drop-out compensation.

However, if the 1H delay lines are used for those processings, the cost of manufacturing is increased, and material use is inefficient.

Japanese Patent Disclosure (KOKAI) No. 55-82583, published on June 21, 1980 (inventor: J. Hirai) discloses a video signal record/playback device in which the three processings as mentioned above can be realized by a single 1H delay line.

In the video signal record/playback device disclosed by the patent disclosure, the output signal from the video signal record/playback device is produced in the form of a video signal in a playback mode.

In use of this device, a noise canceller generally provided in the video tape-recorder is set at the prestage of the comb filter. This is because the signal which can be treated by the noise canceller is the luminance signal, not the video signal.

Provision of the noise canceller at the prestage of the comb filter, however, distorts the waveform of the video signal and deteriorates the quality of the resultant picture.

That is, the noise canceller, to be described later, takes a noise component out of the luminance signal, and subtracts the noise component from the luminance signal, thereby obtaining a luminance signal containing no noise component. In this case, since the peak-to-peak value of the noise component is large at the prestage of the comb filter, the level of the high component of the luminance signal, which is contained in the noise component for subtraction, is large. As a result, the high component is removed by the subtraction operation, and a waveform of the luminance signal is distorted.

Further, in the video signal record/playback device disclosed in the patent disclosure, the comb filter has many adders and subtractors. The characteristics of the comb filter depend largely on the variation of adding and subtracting ratios of the adders and subtractors. In this respect, the adding and subtracting ratios must by exactly fixed. In the case where the number of the adders and subtractors is great, to fix the ratios at desired values is troublesome and time-consuming, and if they are not correctly fixed, the characteristics of the filter are further degraded, and the picture quality is deteriorated.

SUMMARY OF THE INVENTION

Accordingly, an object of the present invention is to provide a video signal record/playback device with an improved picture quality.

According to the present invention, there is provided a comb filter supplied with a video signal having a luminance signal and a color signal, which are superposed in a frequency interleaving manner. The comb filter separates the input video signal into a luminance signal and a color signal. A record video signal is selected in a record mode. In a playback mode, a video signal containing the luminance signal and the color signal, which are superposed one on the other, is selected. The selected signal is applied into the comb filter. With such an arrangement, in either a record or a playback mode, the separated signals, the luminance signal and the color signal, are obtained from the comb filter.

BRIEF DESCRIPTION OF THE DRAWINGS

FIG. 2A, FIG. 2B and FIG. 2C show signal waveforms useful in explaining the effect of the circuit of FIG. 1.

FIG. 3 is a block diagram of an actual arrangement of the circuit of FIG. 1;

FIG. 4 shows a frequency characteristic useful in explaining a drop-out compensating operation in the circuit shown in FIG. 3.

DETAILED DESCRIPTION OF THE PREFERRED EMBODIMENTS

Figure 1:
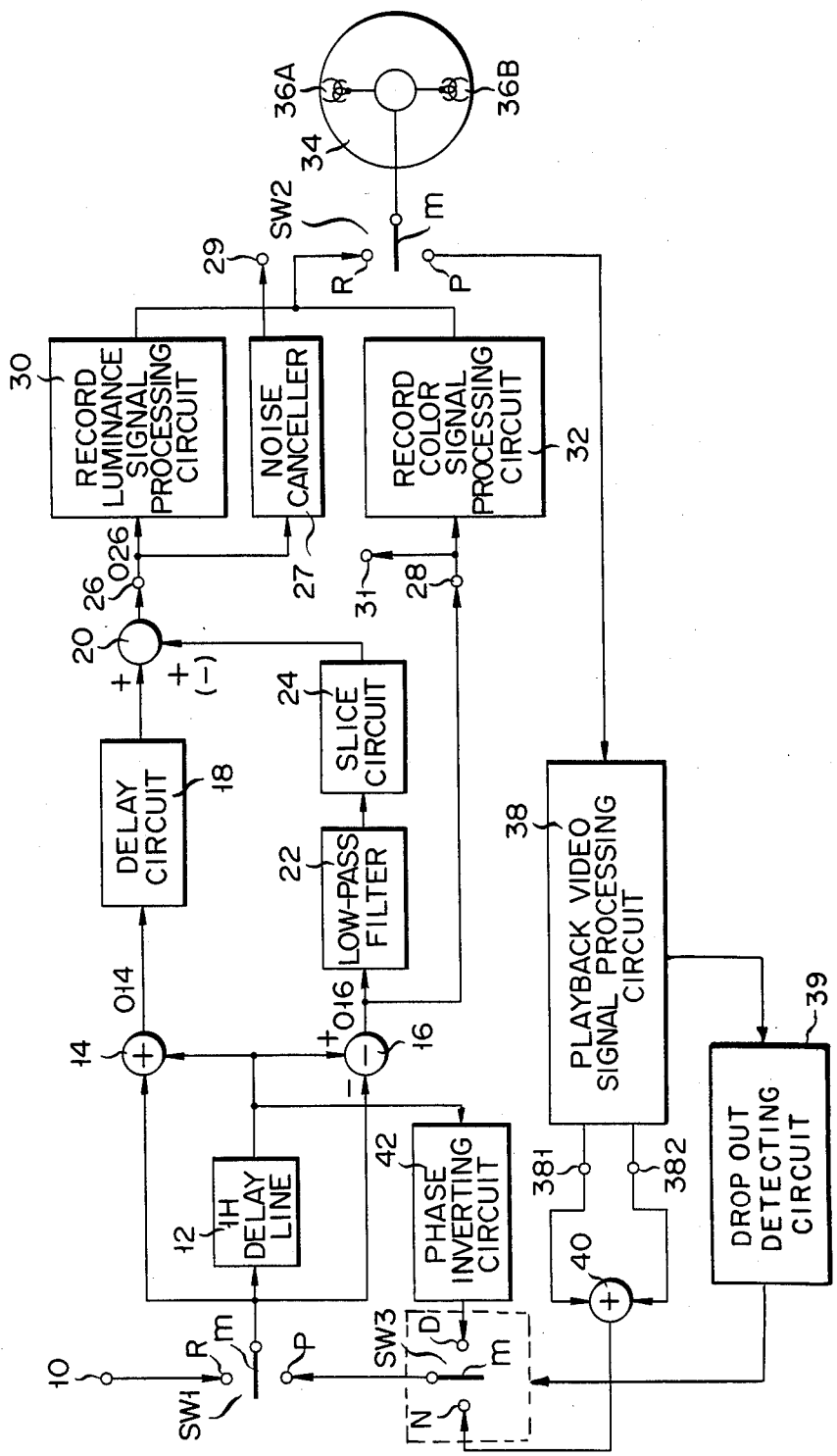
FIG. 1 is a block diagram of an embodiment of a video signal record/playback device according to the present invention.

Preferred embodiment of a video signal record/playback device according to the present invention will be described in detail, referring to the accompanying drawings.

Referring to FIG. 1, there is shown an embodiment of a video signal record/playback device according to the present invention. In the figure, an input terminal 10 receives a video signal to be recorded (referred to as a record video signal). The input terminal 10 is connected to a fixed terminal R of a switch SW1. A movable contact m of the switch SW1 is connected to an input terminal of a 1H delay line 12. The 1H delay line is comprised, for example, by a CCD (charge coupled device). The movable contact m of the switch SW1 is further connected to the first input terminals of an adder circuit 14 and a subtraction circuit 16. The second input terminals of the adder circuit 14 and the subtraction circuit 16 are connected to an output terminal of the 1H delay line 12.

The output terminal of the adder circuit 14 is connected to an input terminal of a delay circuit 18. An output terminal of the delay circuit 18 is connected to one of the input terminals of a summing circuit 20. An output terminal of the subtraction circuit 16 is connected to an input terminal of a low-pass filter 22. An output terminal of the low-pass filter 22 is connected to an input terminal of a slice circuit 24. An output terminal of the slice circuit 24 is connected to the other input terminal of the summing circuit 20.

The output terminal of the summing circuit 20 is connected to an output terminal 26 for a luminance signal. The output terminal of the subtraction circuit 16 is connected to the output terminal 28 for a color signal.

The output terminal 26 is connected to the input terminal of a record luminance signal processing circuit 30. The output terminal 28 is connected to the input terminal of a record color signal processing circuit 32. The output terminal of the circuit 30 and the output terminal of the circuit 32 are connected to the recording fixed terminal R of an record/playback changing switch SW2. The movable terminal m of the switch SW2 is connected to two rotation video heads attached to a rotation cylinder 34.

The playback fixed terminal P of the switch SW2 is connected to the input terminal of a playback video signal processing circuit 38. The circuit 38 has an output terminal 381 for the luminance signal Y and an output terminal 382 for the color signal C. The output terminals 381 and 382 are connected to the input terminals of an adder circuit 40, respectively.

The output terminal of the adder circuit 40 is connected to the fixed terminal N of a switch SW3. A movable contact m of the switch SW3 is connected to the other fixed terminal P of the switch SW1.

The other fixed terminal D of the switch SW3 is connected to an output terminal of a phase inverting circuit 42 with a phase inverting frequency band in the color signal frequency band. An output terminal of the 1H delay line 12 is connected to an input terminal of the phase inverting circuit 42. The output terminal 26, further, is connected to the input terminal of a noise canceller 27. The output terminal of the noise canceller 27 is connected to an output terminal 29 for a luminance signal Y reproduced. The output terminal 28, further, is connected to an output terminal 31 for a color signal C reproduced. In FIG. 1, the 1H delay line 12, the adder circuit 14 and the subtraction circuit 16 cooperate to form a comb filter.

The operation of the video signal record/playback device thus arranged will be described. Hereinafter, a video signal is denoted as V, a luminance signal as Y and a color signal as C. Those signals passed through the 1H delay line 12 are each attached with D.

The operation of the video signal record/playback device in a record mode will first be given. In this case, the movable contacts m of the switches SW1 and SW2 are respectively connected to the fixed terminals R and R. The movable contact m of the switch SW3 is connected to the fixed terminal N. With this connection, the record video signal V applied to the input terminal 10 is applied through the switch SW1 to the input terminal of the 1H delay line 12, the first input terminals of the adder circuit 14 and the subtraction circuit, 16. The video signal V delayed by 1H by means of the 1H delay line is supplied to the second input terminals of the adder circuit 14 and the subtraction circuit 16. The output signal 014 from the adder circuit 14 is given as:

$$014 = V + VD = (Y + YD) + (C + CD) \quad (1)$$

The output signal 016 of the subtraction circuit 16 is:

$$016 = VD - V = (YD - Y) + (CD - C) \quad (2)$$

In this case, if the record video signal V has a 1H corelation, the color signal is phase-inverted every 1H, and hence $(C + CD) = 0$ and $(YD - Y) = 0$. Therefore, under this condition, the equations (1) and (2) are $$014 = Y + YD \quad (3)$$

$$016 = CD - C \quad (4)$$

Accordingly, those separated signals, the luminance signal Y for recording and the color signal C for recording, appear at the output terminals 26 and 28, respectively.

When the record video signal V has no 1H corelation, $(YD - Y) = 0$ does not hold and the output signal from the output terminal 26 bears only part of information. Therefore, under this condition, the $(YD - Y)$ component is extracted from the output signal of the subtraction circuit 16 by means of the low-pass filter 22 and the slice circuit 24. $(YD - Y)$ and the output signal from the adder circuit 14 passed through the delay circuit 18 are summed (added or subtracted) in the summing circuit 20. At this time, the output signal 026 of the output terminal 26 is given as:

$$026 = (Y + YD) + (YD - Y) = 2YD \quad (5)$$

$$026 = (Y + YD) - (YD - Y) = 2Y \quad (6)$$

In this way, the problem that only part of the information is obtained in the output signal at the output terminal 26, is substantially compensated. The summing operation in the summing circuit 20 is not performed until the amplitude of the component $(YD - Y)$ extracted by the low-pass filter 22 exceeds the threshold level of the slice circuit 24.

The delay circuit 18 is provided for adjusting the times of the two input signals to the summing circuit 20, and has a delay time substantially equal to the delay time of the low-pass filter 22.

The luminance signal Y from the output terminal 26 is subjected to processings, frequency modulation and the like, so as to be converted to a signal which can be recorded in the record luminance signal processing circuit 30. The color signal C from the output terminal 28 is subjected to processings, frequency converting to low band and the like, so as to be converted to a signal which can be recorded in the record color signal processing circuit 32.

The output signal from the circuit 30 and the output signal from the circuit 32 are frequency-multiplied, thus forming a signal. This signal is supplied to the rotation video heads 36A, 36B, and recorded on the magnetic tape (not shown).

The video signal record/playback device performs the playback operation in the following manner. The movable contacts m and m of the switch SW1 and SW2 are connected to the fixed terminals P and P, respectively. The movable contact m of the switch SW3 is normally connected to the fixed terminal N. The signal reproduced from the magnetic tape by the rotation video heads 36A, 36B is supplied to the playback video signal processing circuit 38. The circuit 38 frequency-separates the input signal into a frequency-modulated luminance signal and low band color signal, FM-demodulates the luminance signal, thus forming a luminance signal Y, and frequency-converts the color signal to the original band, thus forming a color signal C. The luminance signal Y is output from the output terminal 381, and the color signal C is output from the output terminal 382. These two signals Y and C are added by the adder circuit 40, which forms a video signal V.

The video signal V is applied through the switches SW3 and SW1 to the 1H delay line 12, adder circuit 14 and subtraction circuit 16, as in the record mode. The subsequent operation is exactly the same as that in the record mode, and finally the following signals 026 and 028 appear at the output terminals 26 and 28, respectively:

$$026 = \begin{cases} Y + YD \text{ (in a 1}H\text{-corelation)} & (7) \\ 2Y \text{ or } 2YD \text{ (in a non-1-}H\text{-corelation)} & (8) \end{cases}$$

$$028 = CD - C \quad (9)$$

In this case, in a 1 H-corelation, the comb filter operates to remove the crosstalk and, improves the S/N (signal to noise) ratio.

The luminance signal Y from the output terminal 26 is led to the noise canceller 27 to obtain the luminance signal Y containing no noise component. The output signal from the noise canceller 27 is supplied to the output terminal 29. The color signal C from the output terminal 28 is led to the output terminal 31. The output signals from the output terminals 29 and 31 are mixed, thus forming a reproduced video signal V containing no noise component.

The explanation which follows describes the case where in a playback mode the information is dropped out from the video signal, i.e., a drop-out state occurs.

In the drop-out state, a drop-out detector 39 for detecting as to whether or not the reproduced video signal contains a drop-out produces a signal. Upon this signal, the movable contact m of the switch SW3 is connected to the fixed terminal D. Then, the output signal of the 1 H delay line 12 is applied to the 1 H delay line 12, the adder circuit 14 and the subtraction circuit 16, through the phase inverting circuit 42 and the switches SW3 and SW1. Therefore, the luminance signal 2YD appears at the output terminal 26, while the color signal 2CD at the output terminal 28. In this case, the color signal is phase-inverted every 1H by the phase inverting circuit 42, so that a normal color signal is obtained at the output terminal 28. The phase inverting circuit 42 may be a circuit designed to change by 180° the phase of a signal at 3.58 MHz±500 KHz.

With such an arrangement, the video signal can be taken out in the form of separated signals, the luminance signal and the color signal not only in a record mode but also in a playback mode. This indicates that the noise canceller 27 can be set at the poststage of the video signal record/playback device. As a result, a waveform distortion of the video signal is minimized, with improvement of a picture quality of the reproduced picture.

That is, in principle the noise canceller 27 takes out a noise component NC (FIG. 2B) from the luminance signal Y (FIG. 2A) by means of a high-pass filter, and the noise component NC and the luminance signal Y are subjected to a subtraction processing, to thereby obtain the reproduced luminance signal Y containing no noise component NC (FIG. 2C). In this case, a high frequency component HC (FIG. 2B) of the luminance signal Y as well as the noise component NC appears at the output terminal of the high-pass filter. If the output signal of the high-pass filter is subtracted from the reproduced luminance signal Y, the high frequency component HC of the luminance signal Y will be removed, resulting in a waveform distortion. To avoid this waveform distortion, the output signal of the high-pass filter is passed through a limiter for noise separation to limit the high frequency component HC of the luminance signal Y. In other words, the amplitude of the high frequency component HC of the luminance signal Y is reduced to a minimum by setting a limiter level VL (FIG. 2B) of the limiter to a value substantially equal to the peak-to-peak value of the noise component NC. Then, the luminance signal Y and the output signal from the limiter are subjected to subtracting processing.

The smaller the peak-to-peak value, the more effectively the limiter separates the output signal from the high pass filter into the high frequency component HC and the noise component NC, thereby extracting the component NC. Since the peak-to-peak value of the noise component NC is large at the prestage of the comb filter, the provision of the noise canceller 27 at this prestage requires a large limiter level VL of the limiter for noise separation. The result is an increase in waveform distortion of the video signal V, i.e., the luminance signal Y.

However, in the case where the noise canceller 27 is set at the poststage of the comb filter, the input signal to the noise canceller 27 is the luminance signal Y which is free from crosstalk and which is improved 3 dB in S/N. This indicates that it is possible for the noise separating limiter in the noise canceller 27 to have a small limiter level VL. As a result, the waveform distorsion of the video signal V is minimized, with improvement of the picture quality of the reproduced picture.

Further, since only one adder and one subtractor, are used in the comb filter, it is easy to fix the adding and subtracting ratio to a desired value. As a result, according to this embodiment, a comb filter having desired characteristics is obtained.

Generally, variable resistors, as externally attached parts when the circuitry is fabricated into an integrated circuit, are used for the adjustment of the adding and subtracting ratio.

In the present embodiment, only two variable resistors are required for this purposes. This indicates that there is no need to increase the number of pins, leading to cost and geometric reduction of the integrated circuit.

FIG. 3 is a block diagram of an actual arrangement of the circuit shown in FIG. 1. The circuit shown in FIG. 3 is arranged so as to execute a phase inversion of a color signal using a transversal filter at the time of the drop-out occurence. In the circuit shown in FIG. 3, the transversal filter is constructed using a delay line in the comb filter.

A delay line 44 is provided with an output terminal 441 with a delay time of (1H+τ) and a center tap 442 with a delay time (1H−τ). The video signal selected by the switch SW1 is applied from the output terminal 441 of the delay line 44 to the second input terminals of the adder circuit 14 and the subtraction circuit 16. In this case, the video signal delays by τ behind that of the previous embodiment. The video signal supplied to the first input terminals of the adder circuit 14 and the subtraction circuit 16 is applied after it is passed through the delay lines 46 and 48 with the delay time τ. A time difference between the two signals applied to the adder circuit 14 or the subtraction circuit 16 is kept at 1H, and the separating operation of the video signal into the luminance signal and color signal, and the crosstalk removal operation are executed in the same manner as in the embodiment described above.

A portion in the video signal record/playback device for the drop-out compensation will be described. An adder circuit 50 is connected at one of the input terminals to the outut terminal 441 of the delay line 44 and at the other input terminal to a center tap 442. With this connection, the adder circuit 50, together with the delay line 44, forms a transversal filter.

With such an arrangement, the adder circuit 50 produces a video signal of which the color signal is phase-inverted every 1H. The output signal 050 from the adder circuit 50 is expressed as:

$$050 = \sin\omega(t - 1H + \tau) + \sin\omega(t - 1H - \tau) \quad (10)$$

$$= 2\cos\omega\tau\sin\omega(t - 1H)$$

where $$\tau \text{ is } 1/(2F_{sc}) \quad (11)$$

In the expression (11), $F_{sc}$ is a color signal center frequency and is 3.579545 MHz, for example.

If $\omega = 2\pi F$, the output signal 050 of the adder circuit 50 is $$050 = 2\cos(\pi F/F_{sc}) \sin\omega(t - 1\ H) \quad (12)$$

FIG. 4 shows a frequency characteristic of the coefficient $2\cos(\pi F/F_{sc})$ in the term of $\sin\omega(t-1\ H)$ in the equation (12). As seen from FIG. 4, the coefficient $2\cos(F/F_{sc})$ takes a negative value in the following range $$F_{sc} - (\tfrac{1}{2})F_{sc} < F < F_{sc} + (\tfrac{1}{2})F_{sc} \quad (13)$$

The frequency band in the equation (13) is substantially equal to that of the color signal. The output signal from the adder circuit 50, or the color signal component of the video signal, is inverted every 1 H, and is applied to the switch SW3.

Also in this arrangement, the effects similar to those in the previous embodiment can be obtained.

Incidentally, the delay lines 46 and 48 may be replaced by a single delay line.

What is claimed is:

1. A comb filter device for a video signal record and playback device comprising:
    a comb filter including first delay means arranged to be supplied with an input video signal in a format containing a luminance signal and a color signal which are superposed one on the other in a frequency-interleaving manner, said first delay means having a first output terminal having a delay time and a second output terminal having a delay time $\tau = 1/(2F_{sc})$, where $F_{sc}$ is a central frequency of the color signal, n = 0, 1, 2, . . . , H = the horizontal scanning period and $\tau$ = a constant, second delay means arranged to be supplied with a said input video signal and having a delay time of $\tau$; adding means for adding together the output signal of said second delay means and the output signal of said first output terminal; and subtracting means for subtracting the output signal of said second delay means from the output signal of said first output terminal;
    phase-inverting means for adding together the signals at said first and second terminals of said first delay means;
    playback video signal processing means for producing, in a playback mode, a playback video signal having the superposed format;
    drop-out detecting means, for generating control signals indicative of a drop-out period and of a non-drop-out period; and
    switch means operable in response to the drop-out control signals, for selecting a record video signal having the superposed format in a record mode, for selecting said playback video signal during a non-drop-out period in the playback mode, or for selecting the output video signal from said phase inverting means during a drop-out period in the playback mode, and for applying the selected signal to said comb filter.

2. A comb filter device for a video signal record and playback device according to claim 1, said second delay means comprising first and second delay lines both having a delay time of $\tau$.

3. A comb filter device for a video signal record and playback device according to claim 1, in which said first and second delay means comprises a CCD (charge coupled device).

4. A comb filter device for a video signal record and playback device according to claim 1, further comprising a noise canceller for removing noise components from the separated luminance signal, said noise canceller being connected to receive the output of said comb filter.

* * * * *